Dec. 7, 1937.     H. B. LAWTON     2,101,183
ARRANGEMENT FOR RESETTING HOBS
Filed Oct. 15, 1935     2 Sheets-Sheet 1

INVENTOR.
Howard B. Lawton
BY
ATTORNEY.

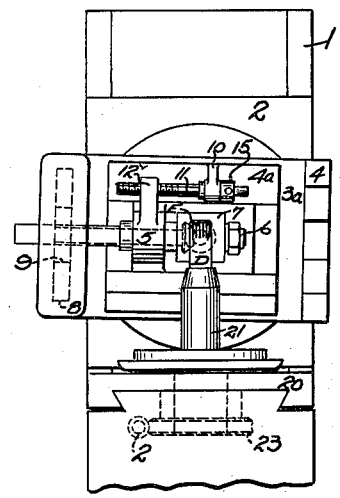
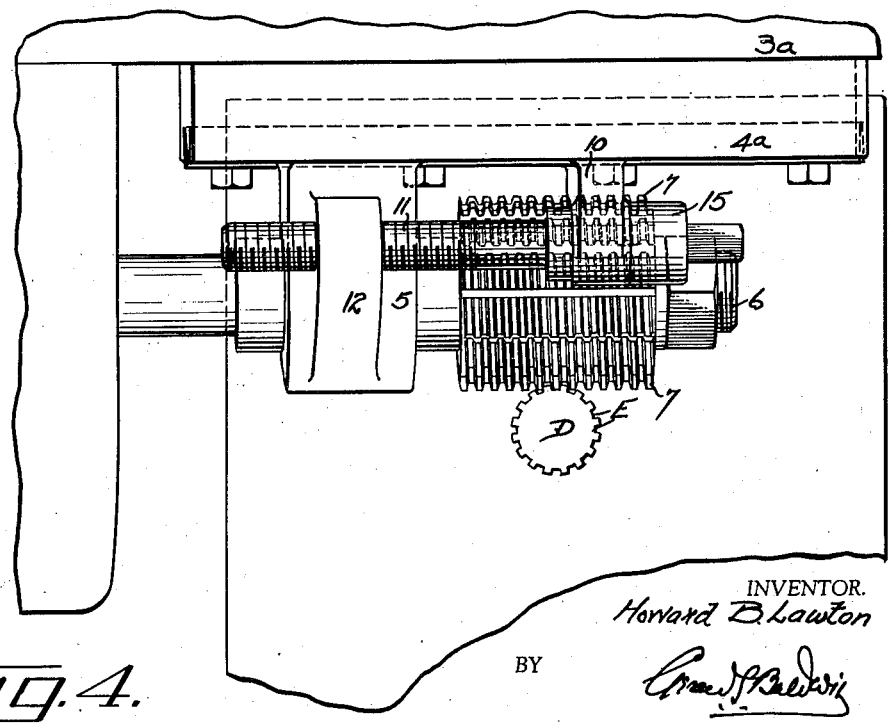

Patented Dec. 7, 1937

2,101,183

UNITED STATES PATENT OFFICE 2,101,183

ARRANGEMENT FOR RESETTING HOBS

Howard B. Lawton, Detroit, Mich.

Application October 15, 1935, Serial No. 45,025

2 Claims. (Cl. 90—4)

This invention relates to improvements in arrangements for re-setting hobs. Hobbing machines are provided with ways on which a carriage is longitudinally movable; upon the latter a cross slide is mounted which carries the hob, and is so arranged that it may be moved across the carriage at varying angles to the direction of movement of the latter. Means are provided for moving the carriage along its ways, and for rotating the hob. The work is mounted for rotation with its axis in alignment with the direction of movement of the carriage. In order to cut a plurality of slots or splines of uniform contour around the periphery of the work with a hob the latter must be so positioned that a line drawn at right angles from its axis through the axis of the work passes through the centre of one of the hob teeth. In order to set a hob correctly so that this condition prevails very exact work is required which can only be performed by skilled mechanics and consumes considerable time.

At the present time whenever the teeth of a hob which are actually doing the cutting, or any of them, become dull or defective it is again necessary to call upon the services of a skilled mechanic who again works for a considerable time to re-set the hob; and during that time, of course, no production is obtained from that machine. For the feed screw by which the cross slide is moved across the carriage bears no fixed relation to the lead of the hob.

It is an object of this invention to provide a simplified arrangement for re-setting a hob so that once it has been correctly set in working position the cross slide on which the hob is mounted may be quickly moved by anyone who is not a skilled mechanic so that the hob is again re-set in another correct operating position. Briefly my method is as follows: For example, if one complete lead or thread measured along the hob axis is .300", and the hob, after having been once correctly set, is moved axially .300" the corresponding tooth of the hob in the next row of teeth is in correct cutting position. We will assume that such a hob has 15 teeth and 15 milled flutes around its periphery, then the axial spacing from the cutting edge of one tooth to the next is .020". Consequently if I move the hob axially .020", or any multiple thereof, it is again in proper cutting position. In actual practice when a hob is set, all the cutting is done by relatively few teeth. Let us assume that in the present case eight teeth do the work, which means that to correctly set another eight teeth in correct cutting position the hob must be moved axially .160". I then usually provide a cross slide feed screw the lead of which is .160", so that each time the feed screw is turned one complete revolution a complete fresh set of teeth are in proper operating position. The rotation of the feed screw is accurately measured by providing an index mark thereon which must be brought into registry with a corresponding mark upon an adjacent stationary bearing portion. Around the portion of the screw upon which the index mark appears other marks are also provided, which, in the present example, are spaced 45° apart; therefore each time one of the marks registers with the stationary mark the hob is in another exactly correct cutting position.

Having thus briefly outlined my invention I will now proceed to describe it with the aid of the accompanying drawings, in which:

Figure 2 is a front elevation thereof.

Figure 4 is a plan view of Figure 3 wherein the work is shown but the work holder is omitted.

Figure 3:
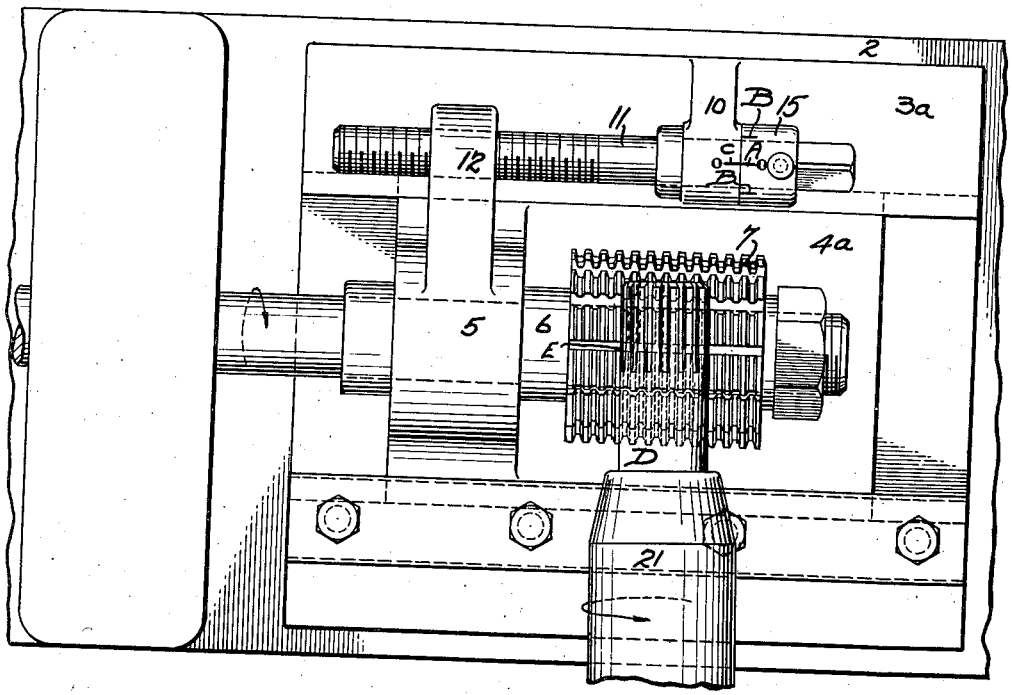
Figure 3 shows an enlarged fragmentary view including the work, the hob and the cross slide feed screw.
Figure 1:
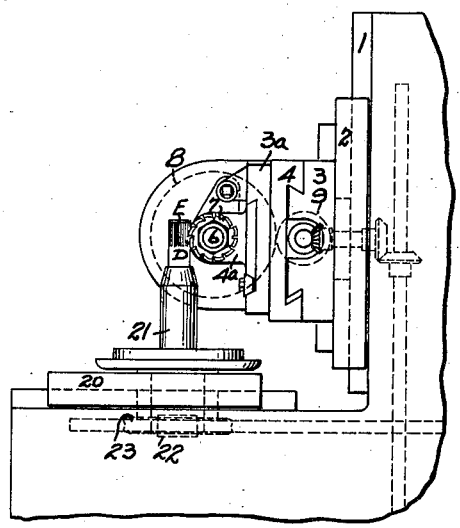
Figure 1 illustrates a side elevation of a portion of a hobbing machine.

Referring to the drawings, 1 denotes ways on which a carriage 2 is mounted, in the present instance for vertical travel. The carriage may be moved along the ways in any conventional manner (not shown). Upon the carriage 2 is a guide 3 on which a cross slide 4 is arranged for movement transversely. Mounted upon the slide 4 is a second outer guide 3a upon which a second outer cross slide 4a is mounted for limited movement parallel to the slide 4.

Rotatably supported in a bearing 5 integral with the outer cross slide 4a is a spindle 6 on which a hob 7 is secured. The spindle 6 may be driven in any preferred manner, as through gearing 8 and 9. Projecting from the guide 3a is a bearing 10 through which a feed screw 11 extends, and the threaded portion of the latter cooperates with a nut 12 integral with the cross slide 4a, so that rotation of the screw causes movement of the slide 4a along the slide 3a. Adjacent one side at least of the bearing 10 a collar 15 is fixed around the screw 11 which turns with the latter.

Mounted also for rotation upon the bed 20 is a work holder 21 for supporting the work D, which in the present instance consists of a shaft in which a plurality of splines E are to be cut. The work holder 21 is rotated proportionately to the rotation of the hob 7 in any desired manner, as through the worm and wormwheel drive indicated at 22 and 23.

The above description is believed to apply substantially to most conventional hobbing machines now in common use. It will be remembered that hobbing machines, in common with most machine tools other than single purpose machines, were originally intended for use by skilled mechanics for the manufacture of one or only relatively few of any given articles. Obviously if a hobbing machine is to be employed to manufacture one or two articles requiring the use of one hob one day, and other articles requiring the use of a different hob the next, there is very little necessity for re-setting the hob. However it has now become a common practice to employ a hobbing machine for quantity production of splined shafts and the like. The continued use of slow re-setting means, requiring the same time and skilled effort as the original setting not only necessitates considerable expense in wages for skilled mechanics but also involves a heavy production loss while the machine is idle.

I therefore make the lead of the feed screw 11 proportionate to the lead of the hob 7. The screw 11 carries an indexing mark A and a plurality of sub-indexing marks B upon the periphery of its collar 15. The mark A is moved into registry with the corresponding mark C upon the bearing 10 before the hob is set in the first instance.

The proportionate leads of the feed screw and hob must be such that each time one of the marks A or B registers with the mark C the hob is correctly re-set. I prefer in most instances that rotation of the feed screw 11 sufficient to bring the next index mark A or B into registry with the mark C moves the hob 7 axially one tooth, and that one complete turn of the screw 11 moves the hob axially sufficiently to bring another full set of hob teeth into operating position.

For instance let us assume that a hob has 12 teeth and 12 flutes, and a lead of .240", and that a full working set of teeth for that particular job is 8 teeth. Then the pitch of the feed screw would be .160", the indexing marks A and B would be 45° apart, and one-eighth of a turn of the feed screw would advance the hob .020", which would be axial distance between teeth of the hob. If, however, it were deemed advisable to turn the screw one revolution to move the hob axially 12 teeth, the pitch of the screw would be .240", and the indexing marks A and B upon the screw would be 30° apart.

Again if the lead of the hob is too great it may be desirable to make the lead of the feed screw equal only to the axial distance between one or two teeth; for instance, if the hob lead is .500" and there are ten teeth and ten flutes, the pitch of the feed screw might only be .100", in which case it would require one-half a revolution of the screw to move the hob axially one tooth.

From the foregoing it will be seen that I have devised a simple and rapid method of re-setting hobs so that all the cuts made by them around the work must be identical.

Having thus described my invention, what I desire to secure by Letters Patent is:

1. A hob re-setting means comprising a guide, a bearing on said guide having an index mark thereon, a cross slide mounted on the guide, a nut on the guide, a spindle carried by the cross slide having a hob fixed thereon, a feed screw mounted on the bearing for rotation and held against axial movement, said screw having an index mark thereon adapted to register with the index mark upon the bearing, and the lead of the hob and feed screw being relatively so proportioned whereby each time the screw is turned sufficiently to bring the two index marks into registry throughout the entire cutting range of the hob the latter is again in correct operating position.

2. A hob re-setting means comprising a guide, a bearing on said guide having an index mark thereon, a cross slide mounted on the guide, a nut on the guide, a feed screw mounted for rotation in the bearing and held against axial movement, said feed screw coacting with the nut and having a main index mark and a plurality of sub-index marks around its periphery all adapted to register with the mark upon the bearing, and the lead of the hob and the feed screw being relatively so proportioned whereby each time the screw is rotated an entire revolution another complete set of hob teeth is moved into correct operating position throughout the entire cutting range of the hob, and each time the screw is turned to bring the next index mark thereon into registry with the bearing mark one fresh hob tooth and all but one of the teeth thereon previously in use are again in correct operative position.

HOWARD B. LAWTON.